United States Patent [19]
Donohue

[11] Patent Number: 5,764,271
[45] Date of Patent: Jun. 9, 1998

[54] MULTI-MODE PRINTING CIRCUITRY PROVIDING ROS PRINTING CORRECTION

[75] Inventor: James M. Donohue, Los Alamitos, Calif.

[73] Assignee: Xerox Corporation, Stamford, Conn.

[21] Appl. No.: 639,239

[22] Filed: Apr. 22, 1996

Related U.S. Application Data

[63] Continuation of Ser. No. 257,264, Aug. 22, 1994, abandoned.
[51] Int. Cl.⁶ .............................. B41J 2/47; G01D 15/14; H04N 1/21; H04N 1/23
[52] U.S. Cl. ............................................. 347/240; 358/298
[58] Field of Search ................................. 347/251, 261, 347/131, 240; 358/298, 296; 395/200.46, 821, 840, 815; 364/167.01, 602, 606, 607, 703

[56] References Cited

U.S. PATENT DOCUMENTS 5,410,414  4/1995  Curry ............................ 347/251

OTHER PUBLICATIONS

Chapter 16, pp. 16–50. *Electronics Engineers' Handbook*, 3rd Edition. Eds. Donald G. Fink and Donald Christiansen. Pulsed Circuits, Logic Circuits, and Waveform Generators. New York: McGraw Hill 1989.

*Primary Examiner*—N. Le
*Assistant Examiner*—Raquel Yvette Gordon
*Attorney, Agent, or Firm*—Robert Cunha

[57] ABSTRACT

A printing system for printing several types of data on the same page, regardless of any differences in spot density between data types. This circuit provides a separate channel for each data type and processes each data type according to its own instructions and parameters (halftones, compressed images, font generation, etc) and according to its own spot density, without there being a necessity for there to be any synchronous relationship between x and y spot densities of the plurality of data types. Each channel has a boundary checker to determine whether the data is within the image boundary by comparing the x/y coordinates of the scanning beam to the input boundary data, and a data converter to convert the data according to its own instructions. Finally, the output of the channels is combined to form the data stream that is sent to the printer.

6 Claims, 6 Drawing Sheets

MULTI-MODE PRINTING CIRCUITRY PROVIDING ROS PRINTING CORRECTION

This is a continuation, of application Ser. No. 08/257,264, filed Aug. 22, 1994 abandoned.

BACKGROUND OF THE INVENTION

A system for combining text, images and graphics, each having an arbitrary and independent clock frequency, modulation method and number of spots per inch in the slow and fast scan directions with respect to the others, into a common data stream for printing.

A continuing problem in the area of printing system design is how to efficiently combine data having different characteristics at high printing rates. Examples of different data formats are text, background color, scanned-in halftones and grayscale images. Text is typically characterized as requiring alternately long (for white) and short (for black) run lengths of bits and one bit per pixel of the same state separated by sharp edges which require a high resolution. Background color normally is coded as long run lengths of identical pixels of one color, but there will be 4 colorants, perhaps of 16 bits each. Grayscale can be 16 bits per pixel or more, but the resolution may be low. Finally there is halftone which may be up to 64 pixels per spot and 4 bits per pixel, but which is generally assigned a low number of spots per inch. All of these can be converted into their high resolution, high number of bits per inch, counterparts and combined, but the resultant system of high bandwidth channels would be complex and expensive.

One example of a circuit simplification is shown and described in commonly assigned U.S. Pat. No. 5,225,911, "Means for Combining Data of Different Frequencies for a Raster Output Device" by Buckley et al. issued Jul. 6, 1993 which is incorporated herein by reference. Here, each different kind of data is kept in its lowest bandwidth form until just before combination in a multiplexing means. For example, one input to the final multiplexer may be background color which simply has an 8-bit per pixel constant color applied to one set of multiplexer inputs. Text and computer generated graphics would be one color applied for the duration of a run length. In this case, halftone color images, continuously variable at high data rates, would have to be generated after the multiplexer, in a halftone generator. One characteristic of this system is that there is assumed to be a relationship between the clock speeds of each data component wherein the clock speed of the final multiplexer and output image generator is a factor of the clock speeds of all of the data components.

A problem not anticipated by the prior art is that the spot size and spot density in the slow and fast scan directions may be randomly different for each set of data. For a numerical example, how would a single printer be able to print three images on one page in one pass when one image has a resolution of 280 pixels per inch vertically and 290 pixels horizontally, the second has resolutions of 300 and 310 and the third is gray scale which is based on a slow scan speed which has no relationship to the other two? What is required is a system that will print mixed data having unrelated spot densities in both directions on the same page in one pass using a single raster output scanner printer.

SUMMARY OF THE INVENTION

This invention is based on the concept that each type of data is fully formed in its own channel, each of which operates at its own clock rate and on its own data format, and then all are combined to form one output which is suitable for printing on a laser printer or display on any raster output scanner.

One or more channels can be either scanned-in bit maps, bit maps received from character generators or computer generated graphics, all of any clock speed. Each channel is given the x/y coordinates of the portion of the output page in which the image is to be displayed, and will produce the appropriate output.

Another channel may contain continuous tone in the form of equations or an image having a number of bits per pixel in the x and y directions. Given the x/y coordinates of the beam, this channel too will produce an output. Similarly, other channels may produce other types of image data, such as halftones.

In all cases, at any point in time, the data of one of the channels is selected and sent to the printer. If the printer can print continuous tone, the data may be printed directly. In the typical case, however, the clock frequency that the data is based on, which is assumed to be different for each channel, is the one that must be used to clock the data out from the channel. In order to print this variety of data speeds, the clock speed for the circuit which combines all of these formats together into one string of data to the printer must be higher than all of the individual channel clock speeds of all of the channels used.

The final requirement is that the scan density in the slow scan direction also be variable. This can be done by applying the x/y position of the scanning beam to all data channels, and using it to determine the number of the raster that is being called for. In this case, the data channel decides what raster number is to be printed, regardless of the the number of the scan that the printer is using. In other words, any number of scans, including fractions, may be used to print one raster.

The result is the printing of any data on a printer where spot densities in both directions for all data inputs may be asynchronous.

DETAILED DESCRIPTION OF THE INVENTION

The system consists of a multiple number of conditioning circuits driving a selector. The selector picks one or more of these conditioning circuits. These selector inputs are then used with the clock to drive the output which, in turn, modulates the raster output scanner (ROS).

Each conditioning circuit tracks the x/y position of the beam and provides an appropriate image level for that position. The data converter translates the data from its input format to a format compatible with the x/y positioning (If the input data is at 300 spots per inch, for instance, the data converter provides an output that corresponds to the nth input pixel of the pth raster until x advances an amount equal to 1/300th of an inch where it supplies the (n+1)th pixel of the pth raster. When y advances 1/300th of an inch the output value will be that of the nth pixel of the (p+1)th raster.

For a halftone, the data conditioner might multiply the appropriate pixel value by some transcendental based on x/y.

The bounds check simply causes the circuit to output only when x and y are between specified limits. This is, of course, a rectangular case. Bounds checkers could also work for other types of geometrical shapes or arbitrary regions defined by maps.

The selector can range from a simple OR gate to a complex logical relationship of the inputs, i.e., show the picture from the conditioner circuit 1 as long as the binary image from conditioner circuit 2 is true.

Note that the circuit is illustrative. One could do all of the processing with a single circuit and store the individual results in memory. The memory could then be read out to actually drive the ROS.

Figure 1:
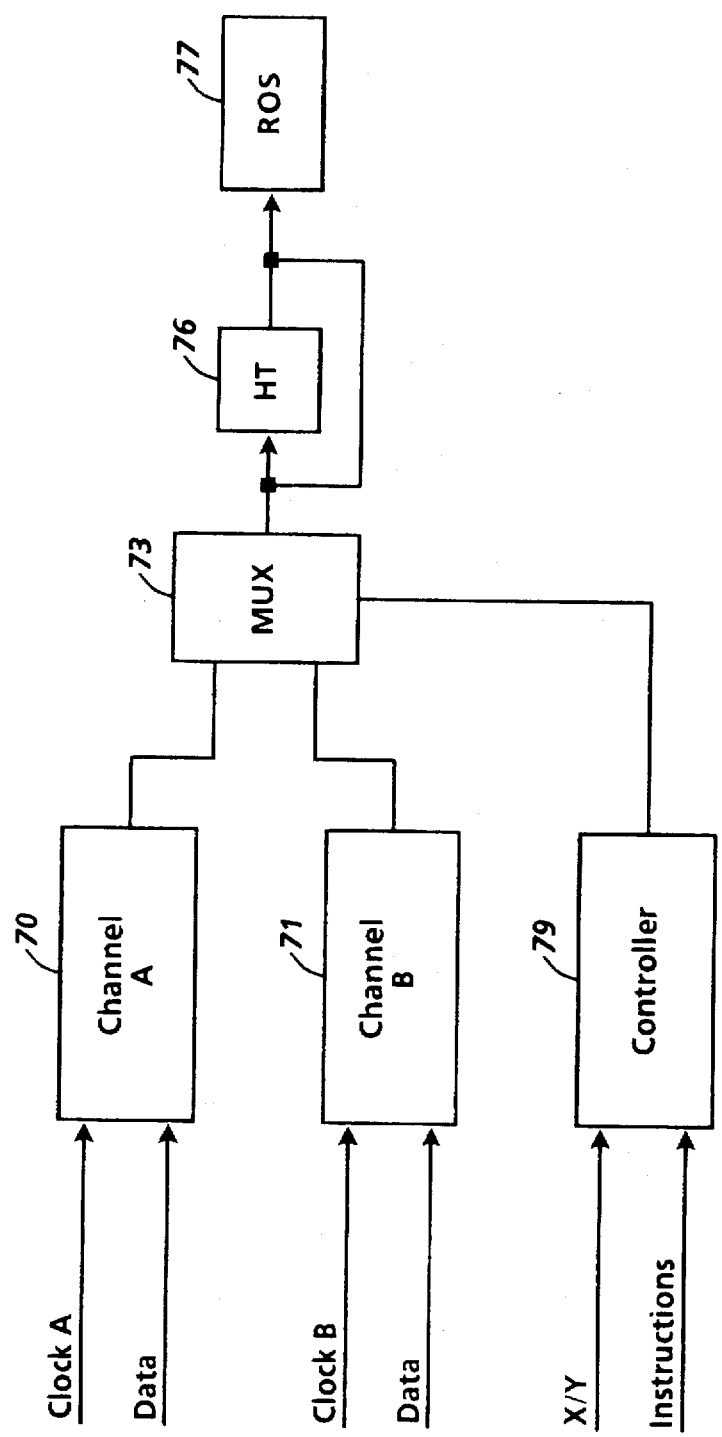
FIG. 1 is a simplified block diagram of the prior art.

FIG. 1 is a simplified diagram of the system described in the incorporated U.S. Pat. No. 5,225,911. Any number of circuits process text, continuous tone pictures, background color, graphics, etc. Only two channels are shown, 70 and 71. These are connected through what can be thought of as a multiplexer tree 73 to the printer 77. If a halftone generator 76 is required, it will be situated between the multiplexer 73 and the printer 77. All operations must be handled in real time and all of the input and output clocks must be a factor of each other.

Figure 6:
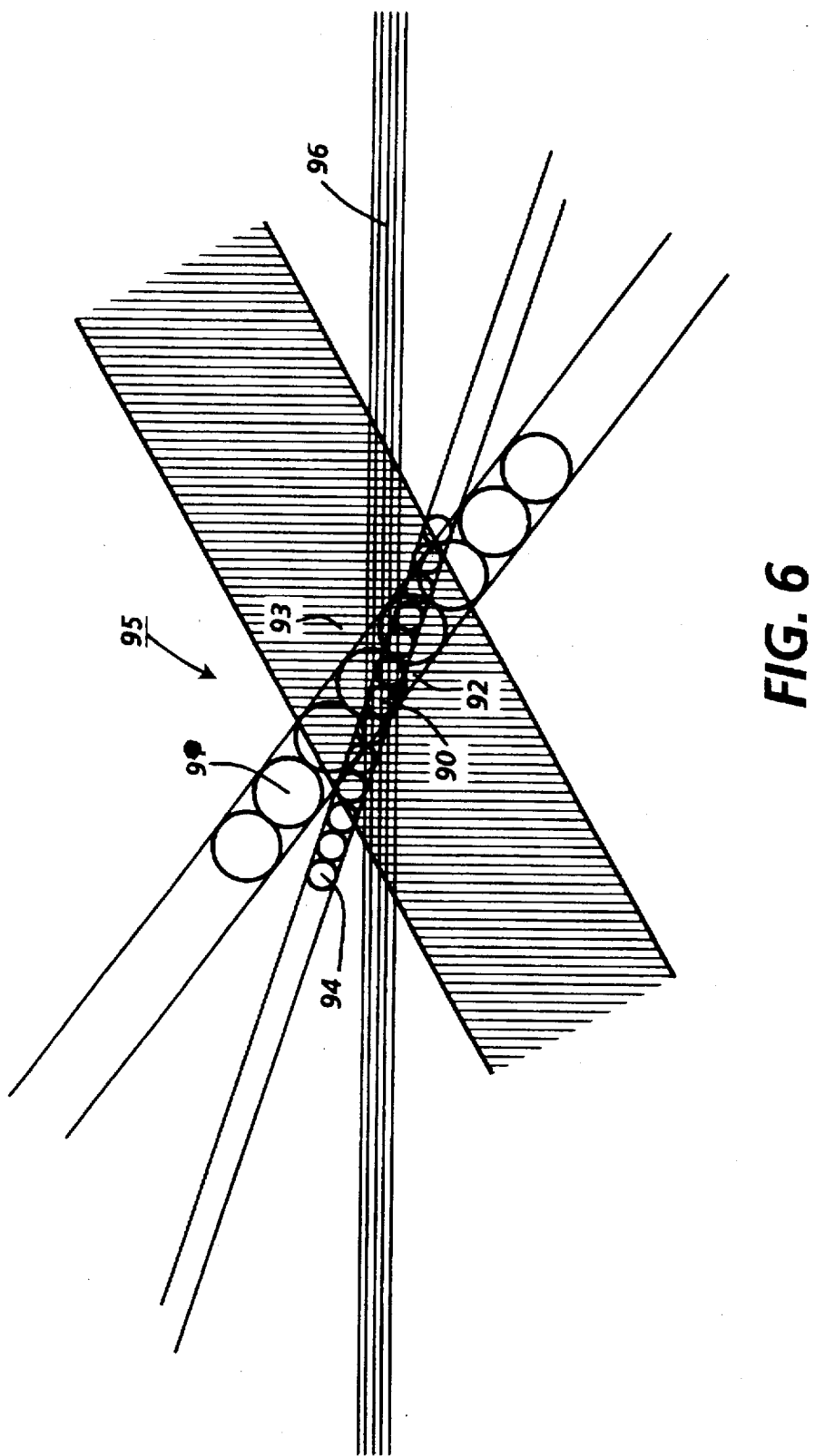
FIG. 6 is an example of a composite data stream.

FIG. 6 is an example of a collection of data where the data speeds of the printer and the data are all different, and therefore, the above described system can not be used. For this example, assume that there is a white backgound 95 crossed by a wide horizontal light gray band 93, and two different rasters of different scan speeds, the larger spots being dark gray 91, the smaller being black 94.

For this discussion, assume black "ink", and that the object is to paint a gray stripe 93 on a white background 95. Therefore areas that do not fall within a spot 93, 92 will be light gray, areas that fall within a large spot but not within a small spot will be dark gray 91, and areas that fall within a small spot will be black 94, 90. Finally, the data must be printed by scanning beams 96 which are not synchronized in any way with the data.

FIG. 6 shows five scan lines 96. It would be typical to assume that either this arrangement is the result of one scanning beam proceeding across the page five times or five parallel beams proceeding across the page once. In the latter case it would be presumed that on the next pass the top beam would be positioned one scan line width below the bottom line of the previous pass. However, there is another possibility. That is, on the next pass, the entire five scan lines are repositioned only one scan line lower than the previous pass. In this case, scan #1 will be overlaid exactly where scan line #2 was on the last pass, scan #2 will be overlaid exactly where scan line #3 was on the last pass, etc. This brings up the possiblility that the spot density at any point will be the sum of the individual pixels. This is another way of producing various shades of gray from a binary data streams.

Figure 2:
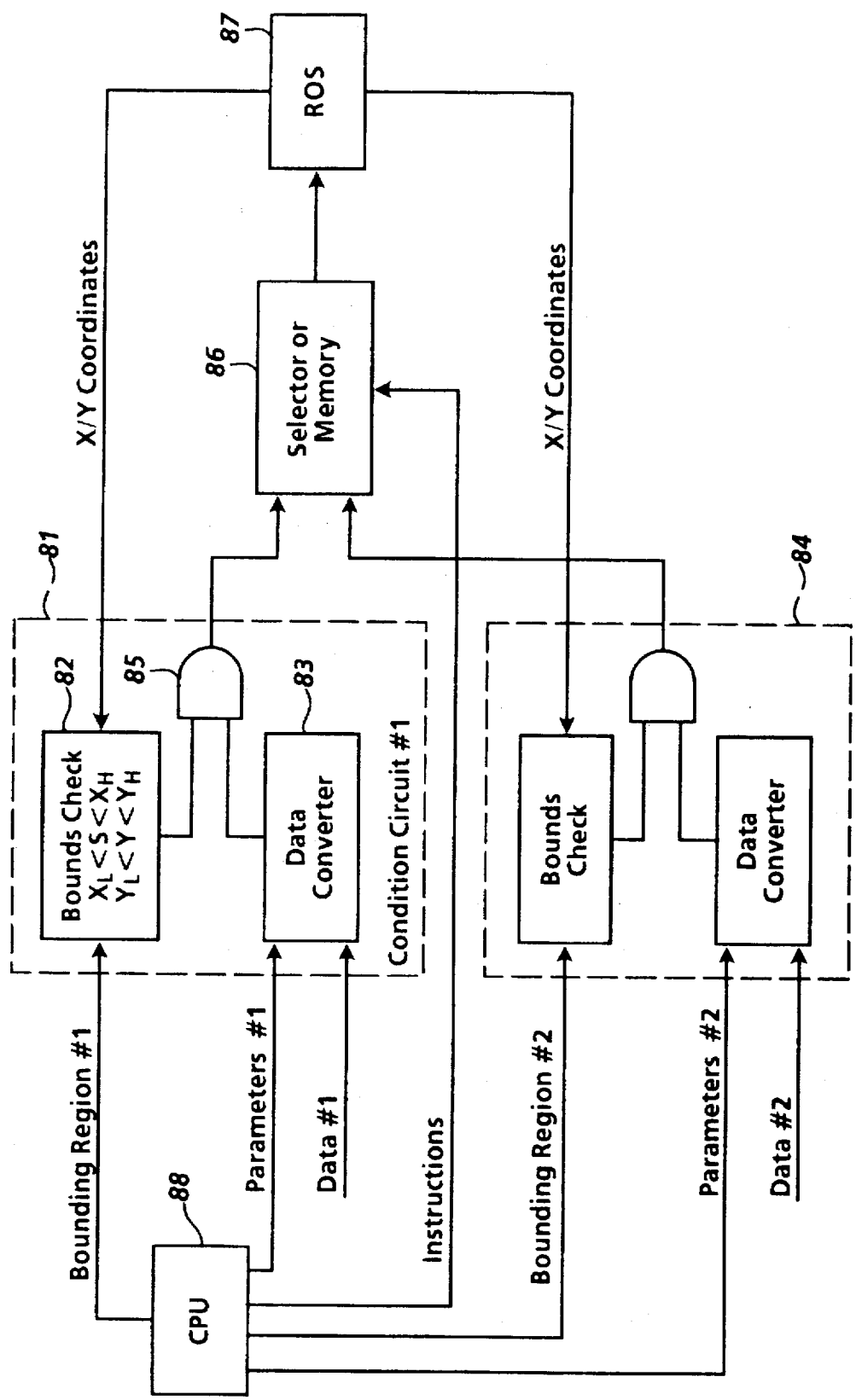
FIG. 2 is a simplified block diagram of this invention.

The system for printing this data is shown in FIG. 2. Each channel 81 and 84 is supplied with the boundaries of the image in x/y cordinates from the CPU 88, and the x,y coordinates of the current scan from the ROS 87. If the current coordinates of the scan are within the length and height of the image boundaries, then the output of this bounds check circut 82 will output an ON signal to device 85 which is an AND gate or equivalent which allows the data generated in the data converter 83 to pass.

The Data converter accepts data in any form such as compressed, thresholded, graphics equations, analog, etc. Then, given the parameters, will convert the input data to any form required by the output terminal. These parameters describe whatever processing is needed, such as color conversion, decompression, halftoning, thresholding, etc. To the extent that the output of the data converter is a graphic which is a function of the current scaning beam position, then the x/y coordinates are applied to the converter 83 for computation. If the data is a bit map, then the input can be partial images that will be stored in the appropriate memory locations and output when the input x,y coordinates specify the row and column addresses that require this output. In all cases the converter output is applied to one input of the AND gate 85, or equivalent, and if the other input is ON, the data will pass on to the selector 86. The outputs of the plurality of conditioning circuits 81 84 can be combined in any manner in the combiner 86. AND, OR, Exclusive OR, and NAND gates could be used, as well as multiplexers, adders etc.

In the alternative, the data outputs from the conditioning circuits could be stored in a memory 86 for later output to the raster output scanner. In this case, as few as one conditioning circuit could be used to supply all of the data.

If the printer is capable of printing an analog output, the combiner 86 output can be used directly. If a digital signal is required, the analog gate output can be conditioned in any appropriate way. For example, if the printer can print continuous tones, the gate output can be used directly. More typically, the combiner output would be digitized prior to printing on the digital ROS. This could be done by a sample and hold circuit in the selector 86, the output of which is pulse width modulated for printing on the printer 87.

Figure 3:
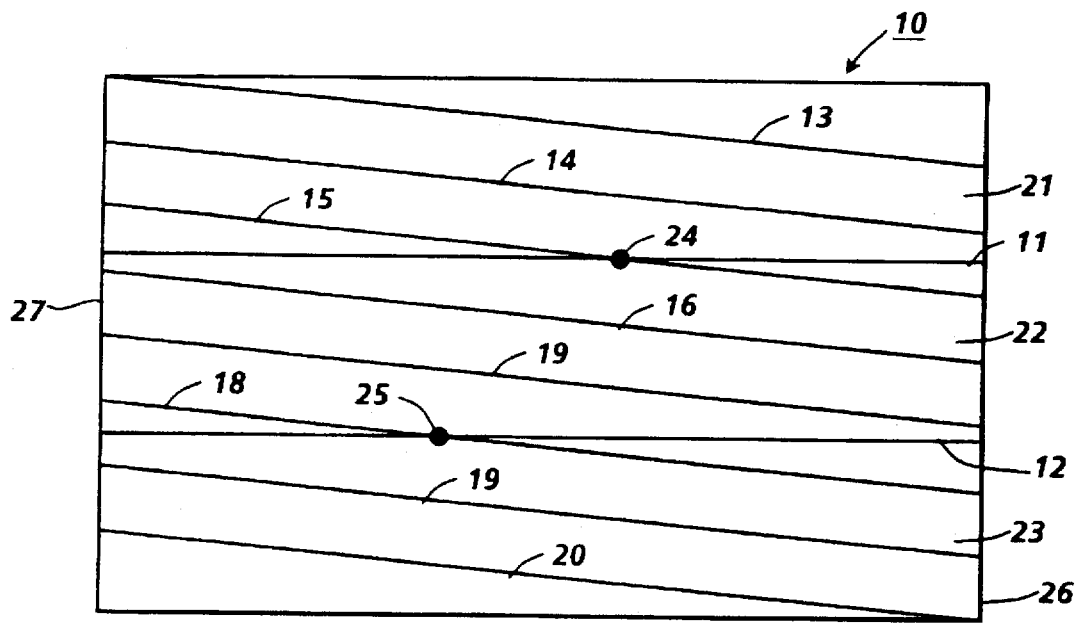
FIG. 3 is a diagram showing eight scans being used to produce three rasters.

One advantageous feature of this system is that, because of its asynchronous nature, it can be adapted to receive and print image information at various resolutions. An example of this variable relationship between scans and rasters is shown in FIG. 3. Assume a rectangular area of the photoreceptor bounded on the left side by the line defining the start of scan 27, and the line defining the end of scan 26. Also, the rectangle comprises the top three rasters of the image, rasters 21, 22 and 23. Now assume scan lines 13 through 20 having a frequency such that 8 scans will cover the three rasters. Now, in accordance with this invention, the image data for the first raster will be supplied to the entire first scan 13, the identical data will be supplied to the second full scan 14, and the same data will be supplied to the third scan 15, but only for the first 2/3 of the scan. At point 24 a transition will occur and the data will be switched over to raster 22 data. If, for example, the first raster 21 is white and the second raster 22 is black, then white pixels will be supplied to scans 13 and 14 and to the first two thirds of scan 15. At the transition point 24, the image data will be switched, and thereafter black pixels will be supplied to the remainder of scan 15, to all of scans 16 and 17 and to the first third of scan 18.

It can now be seen that this technique can be used to match any number of scans to any number of data rasters while maintaining the absolute accuracy of every raster dimension in the process direction. Not only will this technique adapt a particular scan speed to a different raster density, but it will also compensate for process speed variations, since the actual position of the rasters, and not the nominal amount of time between rasters, can be the mechanism by which the start of each raster is determined.

As can be appreciated, switching from one data raster to another in the middle of a scan may cause visual artifacts without the presence of some sort of compensating technique. These artifacts can be described as the beating of the raster frequency with the scan frequency. By increasing the number of scans per raster, these high frequency artifacts may be blurred as in the case of scan doubling or tripling.

It is not necessary to increase the polygon rotation rate to increase the number of scans per raster. Indeed, this may be prohibitive in cost. An alternate way is to provide multiple spot scanning with an electronic raster cache memory which contains the last n rasters output, where n is the number of rasters spanned by the multiple spots instantaneously on the exposure medium plus one. As each point on the exposure medium passes under the space occupied by a particlar scanning beam, the raster associated with that position is output regardless of polygon angular velocity or phase.

Figure 4:
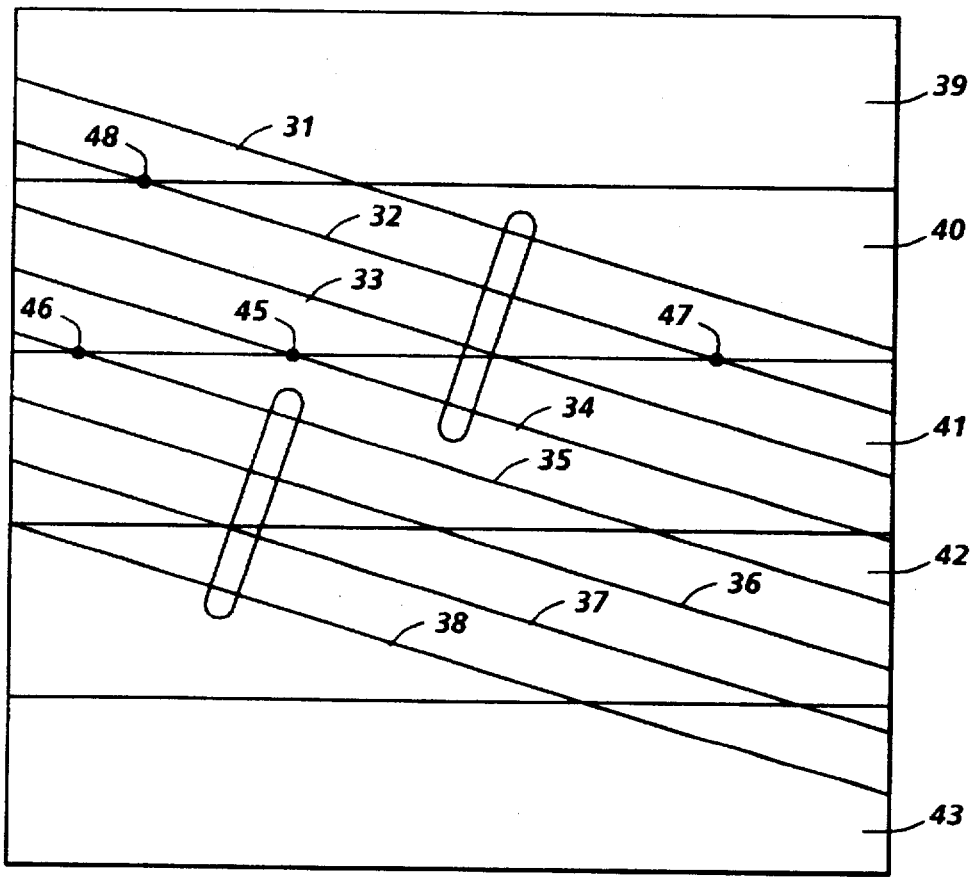
FIG. 4 is a diagram showing the process for generating rasters by a beam generator which generates four beams at the same time.

FIG. 4 shows such a system having four spots scanning the photoreceptor at the same time. Note that the spacing between beams has been set to one scan for simplicity in explanation, although it will be assumed that the beam spacing may be set to any desired value, for instance three, in which interlacing would be used to fill in the exposure. The first set of spots 31–34 scans the photoreceptor as shown, followed by the next scan with spots 35–38. In the worst case one set of spots will enter four rasters, as shown by the second set comprising spots 35–38, which enter parts of rasters 40–43. Therefore, including one extra raster buffer to receive a new raster, the data generator must have a raster buffer holding at least five rasters of data. The first spot travels through parts of rasters 40, 41 and 42 while the last spot 38 also enters raster 43. As each spot reaches the raster boundary, for example at points 48 and 44, the video to the spot will be switched, here from raster 39 to raster 40.

In a conventional ROS, if not tilted, the rasters are parallel to the scans, which are slightly diagonal, since the exposure medium moves a distance as the spot is moved horizontally. In contrast, for the invention described here, the rasters are horizontal as the boundaries between rasters are now dependent on exposure medium position rather than scan number. A particular raster will be composed of the sum of the exposures from each of the spots in the multiple beam system. by controlling the rate at which rasters are incremented as the spots pass over the recording medium, variable density at arbitrarily high resolution may be achieved.

A particular artifact that will occur in an image generated by this system is caused by switching from one raster to another while in the middle of a scan. If this were to occur only once during the printing of an image, the artifact might be invisible, overwhelmed by the random noise in the image. However, this switching might occur once per raster for each beam, and, if the process speed is uniform at one raster per scan, the switching will occur at the same horizontal position during each scan, producing an easily recognizable vertical artifact down the length of the image. In practice, however, the process is not constant, but varying, and is speeding up or slowing down in a more or less erratic sinusoidal manner, which causes the vertical artifact to be distended to the left or right in unequally erratic manner, producing an artifact which runs in an undulating line down the image. A process for eliminating this artifact will be described below.

To determine where the transition points should be if it is desired to achieve motion control, a rotary encoder, or other velocity or position measure device, may be attached to the exposure medium as a means to determine process velocity. The pulses produced by such a device may be used directly as an indication of process position, but only if the desired raster density matches the density of the encoder. More likely, however, there will be fewer pulses per process inch emitted from the measuring device than there are rasters per inch, for reasons of economy. In order to produce a raster clock, a clock with a frequency of one cycle per raster, with a frequency proportional to the process velocity, some sort of frequency multiplication is necessary.

One way to produce such a multiplied clock is to use a frequency synthesizer based on arithmetic, see U.S. Pat. No. 4,766,560, "Parallel/Pipelined Arithmetic Variable Clock Frequency Synthesizer," for teachings on the basic frequency synthesis technique, and U.S. Ser. No. 4,893,136, "Arithmetically Computed Motor Hunt Compensation for Flying Spot Scanners," for a discussion of fast scan compensation which uses a computation technique similar to the one used here. For slow scan positioning errors, such a method may be used to produce a raster clock at any desired nominal raster density, with frequncy variations designed to produce rasters of constant density on the recording medium. An important aspect of this frequency synthesis technique is that numbers are used to generate frequencies, and phase shifts may be generated by appropriate modification of these numbers through arithmetic techniques.

Referring to the artifact previously mentioned, it is apparent that such a problem exists to the extent that the switching of rasters from scan to scan produces a trail which the eye can easily follow down the page. To alleviate this problem, a pseudo-random set of numbers may be employed to offset, either to the left or right in equal probability and differing amounts, the horizontal position at which the switch takes place, destroying the visible trail in the process. While this adds high frequency noise to the system, it also maintains low frequency positon integrity by insuring that the sum of the amounts of the pseudo random phase shifts is zero over a small distance. Refer to U.S. patent Ser. No. 07/288,526, "Pseudo-Random Phase Shifted Arithmetic Bit Clock Generators for Digital Printers" for a discussion on how this technique was successfully applied to a similar problem in the fast scan direction.

In this invention, two significant tradeoffs are being made. First (although a single beam system theoretically may be used), a multiple spot scanning system can be used for raster density and/or process control with closer scan spacing rather than higher speed printing. Each spot is being modulated by the entire contents of the source data file, not a fraction as in conventional interlacing. Since each square inch of recording medium is being exposed once per beam, lower exposure levels per beam are required. Second, artifacts at low exposure levels and a high frequency are being accepted as the cost of eliminating low frequency artifacts caused by the beating of the raster frequency with the scan frequncy. This tradeoff is acceptable, however, since it is the goal of this correction technique to make the artifact frequency so high and exposure level so low as to be outside the perception range of the observer. The recording medium receives the superposition of the multiple exposures produced by multiple spots. Although the data in the rasters will overlap perfectly in the fast scan direction, any artifacts which exist only in one single exposure will not be superimposed. For example, for a four beam system, there will be four different transition points per raster, each at one fourth the intensity of one beam.

Due to physical limitations of scanner technology, most printers are built to perform at a particular bit density. It is generally not feasible to use a data file already halftoned or formatted to a particular density on a printer designed for a different density since the image will physically be enlarged or minified in accordance with the fixed density of the printer. For example, an 8½"×11" file at 200 by 300 pixels per inch would be 6.4"×8.3" when printed on a 400 spi printer. Parallel printing methods such as diode arrays, with fixed spacing of printing elements in the fast scan direction, are able to vary density only in the slow scan direction. Polygon scanners, although quite able to vary density in the fast scan direction, have a fixed density imposed by the unalterable separation of rasters in the slow scan direction. It should be noted that varying the speed of the polygon to achieve variable slow scan density has proved unsuccessful in the past in part due to the time it takes the polygon to servo to the appropriate speed. With this invention, it will be feasible to print files formatted for a wide variety of densities on the same printer. Indeed, it is quite possible to merge data of different densities onto the same image.

In the past, process speed variation, such as that caused by gear cogging, sun gear runout, and process motor speed variation, have been an impediment to high quality reproduction. Other problems such as polygon wobble, or color pass registration in color printers affect the quality of the reproduction. Usually, these problems have been solved by providing gear trains, motors, and mechanical parts of such high quality that these problems are reduced to an acceptable level, but this may have a high cost associated with it. By monitoring the process speed and/or position in real time, and sending this information back to the density control electronics, these problems may be alleviated to some extent by this invention, depending on the accuracy and resolution of the process speed and position information.

Figure 5:
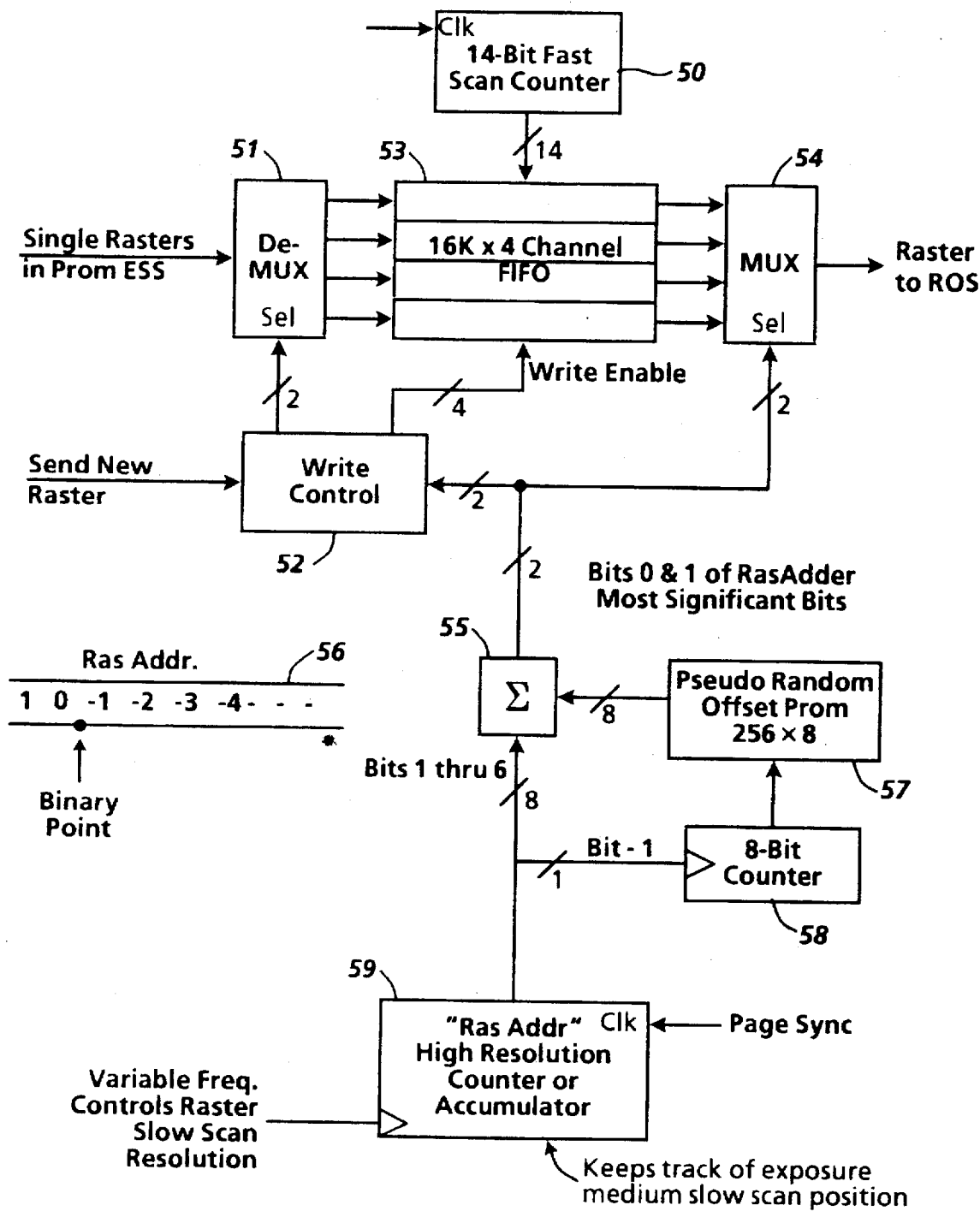
FIG. 5 is a block diagram of a circuit implemention.

A schematic diagram of the inventive circuit is shown as FIG. 5. At the start of operation the four lines of memory in RAM 53 are loaded from the video generator through a demux 51 with the video data representing the first four rasters of the image to be output to the photoreceptor. A start of scan signal is received by the pixel clock generator 50 which starts a 14 bit counter, the output of which is used to address the four channels of memory 53, each channel comprising a line of video representing one raster to be printed. All four lines of output are sent to the mux 54. The summer 55 is originally set to 0 thereby selecting the first raster to be output from the mux 54. At the start of the second scan the second SOS signal will be received and the counter 50 restarts from zero. The first raster will continue to be output on this second, and subsequent scans, until the mux 54 is controlled to select the second raster, which will happen as follows.

Completely asynchronous to the frequency of the scan speed, an encoder can be used to measure the process speed, and to output a number of pulses per raster, applied to the input of the raster counter 59. On the other hand, the variable frequency can be supplied by a frequency synthesizer set to a particular frequency, which is equivalent to calculating where rasters should be placed, achieving no motion control. For a third possibility, an accumulator may be used generating RasAddr (56) directly, either being a function of the motor or not, depending on whether or not the frequency determining parameter of the accumulator (the number being accumulated) is varied as a function of the motion. In any case, the bits of the counter or accumulator to the left of the decimal point represent the raster number, and the bits to the right, shown as −1, −2 etc., represent fractions of a raster. In the simplest case, the two bits to the left of the decimal place could be sent to the mux 54.

The problem with this circuit is that the artifacts may form a visible pattern if they occur at the same place on the scan line for a number of consecutive scans. To hide this line of artifacts, each transition point can be moved a small random distance to the left or right, blurring it to the point where it is no longer visible. This is accomplished by using the −1 bit of the raster address counter 59, the count of which is shown as RasAddr 56 to clock an 8 bit conter 58. The eight bit output is used to address RAM 57 which outputs a random offset in the form of a binary number. This random number and the counter 59 output are summed in summer 55, and the resultant two bits to the left of the decimal place are used to switch rasters instead of the original two bits of the raster address counter 59. The result is that the raster switching point becomes slightly random, and therefore invisible.

Figure 7:
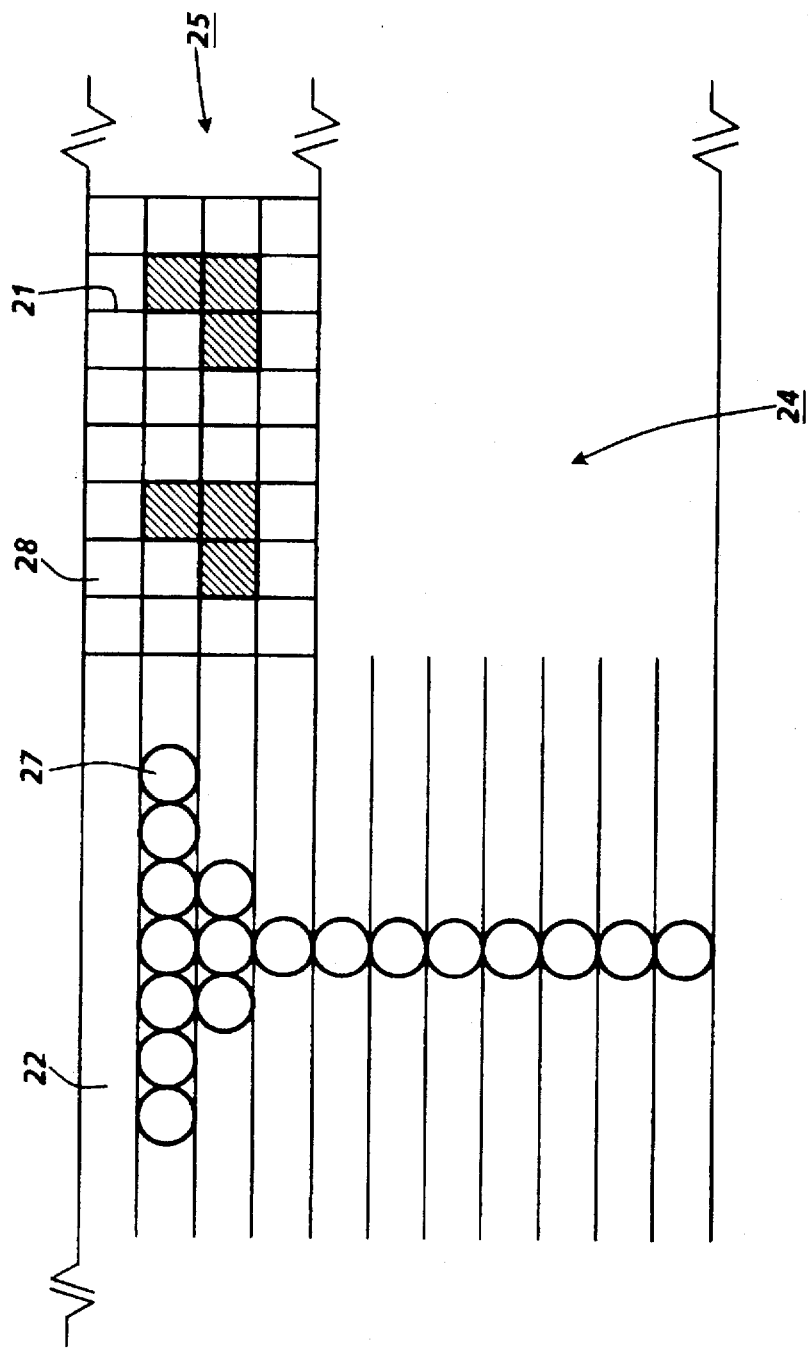
FIG. 7 is a diagram showing two asynchronous rasters.

The description above assumes that a raster extends from left to right (or top to bottom) across the entire page in the fast scan direction. However, this invention enables switching from one raster to another in mid scan. Such a switching is shown in FIG. 7 which is a simplified drawing of the top portion of a page which is being printed using a left-to-right fast scan. The left half of the page shows a single character being printed using a number of closely packed rasters 22 which used closely packed pixels 27 to form characters. At the same time, on the right side of the page there is shown the top two dots 28 21 in the first of two rasters 21 25 of a halftoned image. Here, there is no simple relationship between the two portions of the page. There are something more than 5 text rasters 22 for each one halftone raster 25. Also, the individual pixels of text 27 are slightly smaller than the individual dots 28 of the halftone matrix. This arangement is produced by having one channel produce the text as long as the x/y coordinates indicate that the scan is on the left side of the page, and having another channel produce the halftone as long as the x/y coordinates indicate that the scan is on the right side of the page.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

I claim:

1. A system comprising a raster output scanner having a scanning beam which scans in fast and slow scan directions to print data from a plurality of data sources onto a page, comprising:

first means responsive to said raster output scanner for determining and outputting x/y coordinates of said scanning beam with respect to the page, a means for generating a boundary defined by x/y coordinates with respect to the page for the data from each data source and a means for generating instructions for converting said data for each data source, a data channel for each data source for receiving data from each data source, each data channel comprising A. a second means for determining whether said x/y coordinates of the beam are within said boundary, B. data means for receiving data from one of said data sources and, C. means, responsive to said second means for determining, for outputting said data from said data means if said beam x/y coordinates are within said boundary, means for selecting the data from one of said data channels, and wherein said raster output scanner displays said selected data.

2. The system of claim 1 wherein said data means processes said data.

3. The system of claim 1 wherein said raster output scanner is a printer.

4. The system of claim 1 wherein said means for outputting is an AND gate.

5. The system of claim 1 wherein said means for selecting is a multiplexer.

6. The system of claim 2 wherein said data means comprises a halftone generator.

* * * * *